US005312680A

United States Patent [19]

Carolyn N. Simpson

[11] Patent Number: 5,312,680

[45] Date of Patent: May 17, 1994

[54] TAMPER-REVEALING SEALING DEVICE FOR PACKAGED DOCUMENTS

[76] Inventor: Carolyn N. Simpson, 1946 East 6400 South, Salt Lake City, Utah 84121

[21] Appl. No.: 85,259

[22] Filed: Jul. 2, 1993

Related U.S. Application Data

[63] Continuation of Ser. No. 888,142, Feb. 25, 1991, abandoned.

[51] Int. Cl.[5] .................... B32B 9/00

[52] U.S. Cl. .................... 428/321.5; 428/40; 428/402.2; 428/905; 428/916; 206/807

[58] Field of Search .................... 428/915, 916, 199, 40, 428/402.2, 321.5, 905; 206/807, 459

[56] References Cited

U.S. PATENT DOCUMENTS

| | | | |
|---|---|---|---|
| 3,896,965 | 7/1975 | Cornell | 220/359 |
| 4,121,003 | 10/1978 | Williams | 428/40 |
| 4,516,679 | 5/1985 | Simpson et al. | 206/459 |
| 4,608,288 | 8/1986 | Spindler | 428/78 |
| 4,720,423 | 1/1988 | Fraser | 428/313.5 |
| 4,986,429 | 1/1991 | Singleton, Jr. | 215/230 |

*Primary Examiner*—Patrick J. Ryan
*Assistant Examiner*—Abraham Bahta
*Attorney, Agent, or Firm*—Mallinckrodt & Mallinckrodt

[57] ABSTRACT

Stain-loaded seals and stain-free seals for packaged documents bear matching, identifying numbers or like symbols on their upper surfaces, respective coatings of adhesive on their lower surfaces, and respective peelable sheets of backing material covering their adhesive layer. The stainloaded seal bears one or more frangible containers of staining material which is released if there is an attempt to remove the seal after the seal is adhered to a substrate. The stainfree seal is adhered to an envelope or package as a seal so that any attempt to open the package or envelope will result in tearing of the seal and thereby evidence that the package or envelope has been opened.

3 Claims, 1 Drawing Sheet

TAMPER-REVEALING SEALING DEVICE FOR PACKAGED DOCUMENTS

This is a continuation of copending application(s) Ser. No. 07/888,142 filed on Feb. 25, 1991, now abandoned.

BACKGROUND OF THE INVENTION

1. Field:

The invention relates to sealing devices for securing packages or envelopes so that any unauthorized access to same will be evidenced by a tamper-revealing, broken seal.

2. State of the Art

Normally, envelopes and packages are not provided with any means for detecting tampering. A package or envelope can be opened, the contents or documents contained therein inspected or read and the contents resealed in another package or envelope without the intended recipient ever knowing that the contents of his package or envelope had been revealed to an unauthorized viewer.

SUMMARY OF THE INVENTION

It is, therefore, a general object of the present invention to provide a sealing device for use in sealing a package or envelope so that the contents of the package may not be viewed by unauthorized persons without providing evidence of the unauthorized viewing.

It is another object of the present invention to provide a seal containing a staining material that will rupture upon any attempt to remove it and will stain the substrate to which it is adhered.

In accordance with the above objects, the present invention is a tamper proof sealing device which usually comprises a strip of material providing a stain-free seal having marked thereon a serial number or like identifying symbol separated by lines of demarcation or perforations from a stain-loaded seal marked with a serial number or like identifying symbol matching the stain-free seal. The bottoms of the seals have an adhesive substance covered by a nonsticky material for peel and stick adhesion of the stain-free seal and the stain-loaded seal to a package substrate and contents substrate, respectively.

There are several alternative ways of constructing the stain-loaded seal. In one embodiment, it comprises two layers, including an upper sheet and a lower sheet of thin material such as paper or plastic, bonded together around their outer edges. Between these two sheets, there is a staining material which can be dye, ink, colored sticky powder, or the like. The staining material can be enclosed in microencapsulation vesicles secured to the bottom surface of the upper sheet.

The stain-loaded seal is secured to the substrate contents of an envelope or package, and the envelope or package is sealed with the stain-free seal. If unauthorized access is made to the sealed envelope or package, the broken stain-free seal provides evidence that such entry was made. Should the unauthorized person try to remove the stain-loaded seal in an effort to replace both seals and the envelope or package to cover up the unauthorized access, it will rupture and the staining material contained therein will escape and stain the substrate to which it is adhered, thus preventing substitution of seals in an unnoticable manner.

THE DRAWINGS

The best modes presently contemplated for carrying out the invention commercially are illustrated in the accompanying sheet of drawings, in which:

FIG. 1 represents a perspective view of an embodiment of the present invention, showing multiple stain-loaded seals and stain-free seals connected in series and wound into a roll;

FIG. 2, a cross-sectional view taken on the line 2—2 of FIG. 1 and drawn to a much larger scale;

FIG. 3, a similar cross-sectional view of an alternative embodiment drawn to the same scale as FIG. 2;

FIG. 4, a similar cross-sectional view of another alternative embodiment drawn to the same scale as FIG. 2;

FIG. 5, a similar cross-sectional view of still another alternative embodiment drawn to the same scale as FIG. 2;

FIG. 6, a fragmentary top plan view of an alternative embodiment drawn to the same scale as FIG. 1;

FIG. 7, a top plan view of another alternative embodiment; and

FIG. 8, a cross sectional view taken along line 8—8 of FIG. 1 and drawn to the same scale as FIGS. 2-5.

DETAILED DESCRIPTION OF THE ILLUSTRATED EMBODIMENT

Figure 1:
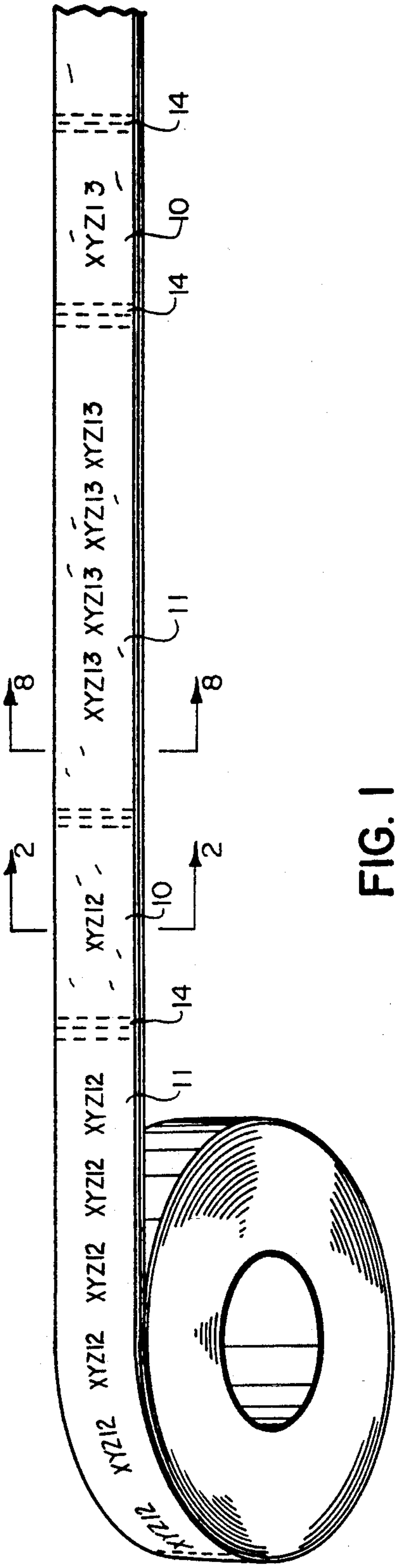

In FIG. 1 is shown an embodiment of a series of multiple stain-loaded seals 10 and multiple stain-free seals 11 according to the invention interconnected end-to-end to provide a roll 12 of tape of any desired length. The seals 10 and 11, as shown in FIG. 1, preferably include serial numbers or like identifying symbols impressed by stamping, embossing, printing, fixed thereon by heat application, or otherwise. The stain-free seals 11 are preferably made separable from the stain-loaded seals 10 by perforations 14 which extend across the width of the stain-free seals transversely of the length of the tape.

Figure 2:
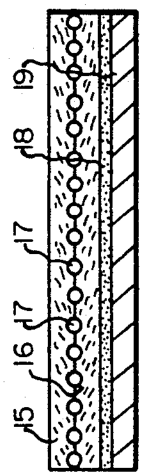

There are several alternative ways to construct the stain-loaded seals 10 according to the invention. One way, as shown in FIG. 2., includes an upper sheet 15 and lower sheet 16 of a thin and frangible material, shown here as paper, although it could be plastic or foil or the like, stacked and sealed or bonded together. Staining material, which can be a liquid such as ink, dye, food coloring, or colored sticky powder, but preferably a commercially available product known as "thief's powder", is contained in frangible, microencapsulation vesicles 17. The bottom side of the lower sheet 16 is coated with a layer of adhesive 18, which is covered over by a thin sheet of backing material 19, preferably plastic although wax paper or a like non-sticky material could be used. The backing material 19 does not adhere well to the adhesive 18 and can be easily peeled away when it is desired to expose and press-fit the adhesive to a substrate document.

Figure 3:
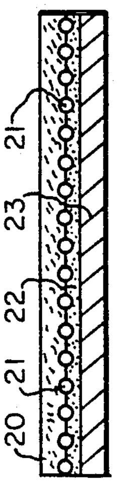

An alternative way of making the stain-loaded seal 10 is shown in FIG. 3. As before, there is an upper sheet 20 of thin, frangible material, preferably paper. Secured to the underneath side of upper sheet 20 is a layer of frangible microencapsulation vesicles 21. The vesicles 21 are coated over with a layer of adhesive 22. Such adhesive layer 22 is covered with a layer of thin, non-sticky, backing material 23.

Figure 4:
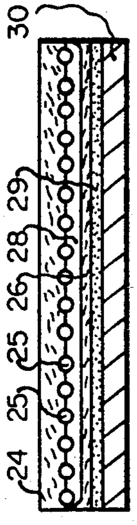

Another alternative way of making the stain-loaded seal 10 is shown in FIG. 4. In this embodiment, there is an upper sheet 24 of thin, frangible, paper and a layer of frangible microencapsulation vesicles 25 secured to the underside thereof. Such upper sheet 24 is bonded to a lower sheet 26 of thin, frangible paper along edge margins thereof. Edge bonding of the sheets can be by application of an adhesive bonding, by application of heat and pressure thereto, or by any like method, and can be accomplished in a vacuum. Except at edge the edge margins, sheets 24 and 26 are independent from one another and there is a free space 28 between the two for holding a staining material. The bottom side of lower sheet 26 is coated with an adhesive 29 and is preferably covered with a peelable sheet of backing material 30.

Figure 5:
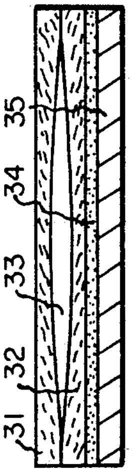

Yet another alternative way of constructing the stain-loaded seal 10 is shown in FIG. 5. In this embodiment, there is an upper sheet 31 of thin, frangible material, here shown as paper and a lower sheet 32, that are stacked and sealed or bonded together at the edge margins thereof. Edge bonding of the sheets can be performed as previously described. Except at the edge margins, the sheets are independent from one another forming free space 33. The bottom side of lower sheet 32 is coated with an adhesive material 34 and is preferably covered, as previously described, with a peelable sheet of non-stick backing material 35. In free space 33, a staining material, as previously discussed, can be stored.

Figure 8:
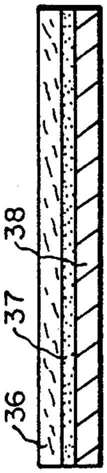

The stain-free seal 11 is cf simpler construction. As shown in FIG. 8, it comprises a sheet 36 of thin, frangible paper, a layer of adhesive 37 coating the bottom side thereof, and a peelable sheet of non-stick backing material 38 covering the adhesive.

Figure 6:
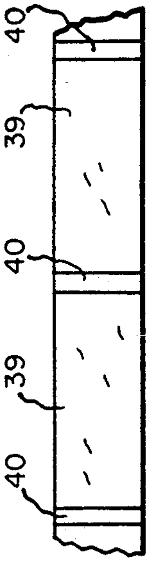

As depicted in FIG. 6, a stain-loaded seal 39 does not necessarily have a serial number stamped thereon and can be used alone to seal a package or envelop. They are preferably provided in a thin, continuous strip, in series, but separated by a section 39 which contains no staining material and which is marked by a pair of lines to indicate where the seals can be cut to separate them from the continuous strip.

Figure 7:
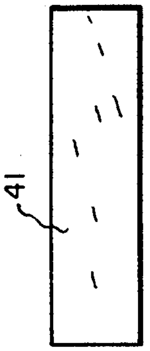

Alternatively, the stain-loaded seals can be supplied as an individual seal 40, FIG. 7, here shown as rectangular but it could be other shapes as well.

Once adhered to a substrate package or contents the seals are tightly adhered thereto but are constructed to be sufficiently frangible so that any attempt to remove the seals will result in their tearing. This requires that the adhesive must form a strong bond to the substrate, or at least strong enough so that it resists breaking the bond with sufficient force so that the seal will be torn if one attempts to remove it. Once the stain-loaded seal is torn, the staining material contained therein will leak out and stain the substrate to which the seal is attached.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow

I claim:

1. A tamper-revealing strip of multiple sealing devices spaced apart end-to-end and each comprising:

a stain-loaded seal including a sheet of frangible material having a top side and bottom side, the bottom side of said sheet being coated with an adhesive material;

a staining material contained within microencapsulation vesicles of frangible material which are secured by said adhesive material to the bottom side of said sheet of frangible material; and a sheet of peelable backing material covering said adhesive material and said vesicles, said frangible components being sufficiently frangible so that any attempt to remove the seal one adhered to a substrate will result in the treating of said frangible components and the release of the staining material associated therewith, said sealing devices being spaced apart end-to-end by non-staining portions of said strip that are marked transversely for the separation of successive sealing device without disturbance thereof to cause stainings.

2. A tamper-revealing strip of multiple sealing devices according to claim 1, wherein each non-staining portion comprises:

a stain-free seal including a sheet of frangible material having a top side and a bottom side, the top side thereof being marked with an identifying symbol matching an identifying symbol on said stain-loaded seal and the bottom side thereof being coated with an adhesive material, said stain-free seal being sufficiently frangible so that once adhered to a substrate it cannot be removed without tearing; and a sheet of peelable backing material covering the adhesive coated side of said stain-free seal.

3. A tamper-revealing strip of multiple sealing devices according to claim 1, wherein each stain-loaded seal is separable from the next by virtue of a series of transversely spaced perforations across the widths of said non-staining portions of said strip.

* * * * *